United States Patent
Luzzatti et al.

(10) Patent No.: US 8,650,301 B2
(45) Date of Patent: Feb. 11, 2014

(54) ADAPTIVE DATA RATE STREAMING IN A PEER-TO-PEER NETWORK DELIVERING VIDEO CONTENT

(75) Inventors: Omer Luzzatti, Tel-Aviv (IL); Eran Weiss, Ramat Gan (IL)

(73) Assignee: RAY-V Technologies, Ltd., Tel Aviv (IL)

(*) Notice: Subject to any disclaimer, the term of this patent is extended or adjusted under 35 U.S.C. 154(b) by 102 days.

(21) Appl. No.: 13/167,384

(22) Filed: Jun. 23, 2011

(65) Prior Publication Data

US 2011/0258322 A1    Oct. 20, 2011

Related U.S. Application Data

(63) Continuation-in-part of application No. 12/244,756, filed on Oct. 2, 2008, now Pat. No. 7,996,546.

(51) Int. Cl.
*G06F 15/173* (2006.01)

(52) U.S. Cl.
USPC ............................ 709/226; 709/224; 709/236

(58) Field of Classification Search
USPC ......... 709/203, 204, 205, 217, 223, 224, 226, 709/228, 229, 231, 232, 233
See application file for complete search history.

(56) References Cited

U.S. PATENT DOCUMENTS

| | | | |
|---|---|---|---|
| 6,091,777 A | 7/2000 | Guetz et al. | |
| 6,195,680 B1 | 2/2001 | Goldszmidt et al. | |
| 6,366,614 B1 | 4/2002 | Pian et al. | |
| 6,377,548 B1 | 4/2002 | Chuah | |
| 6,490,627 B1 | 12/2002 | Kalra et al. | |
| 6,510,553 B1 | 1/2003 | Hazra | |
| 6,662,230 B1 | 12/2003 | Eichstaedt et al. | |
| 6,731,600 B1 | 5/2004 | Patel et al. | |
| 6,732,183 B1 | 5/2004 | Graham | |
| 6,968,387 B2 | 11/2005 | Lanphear | |

(Continued)

FOREIGN PATENT DOCUMENTS

| | | |
|---|---|---|
| WO | 2007/110865 | 10/2007 |
| WO | 2008/038280 | 4/2008 |

OTHER PUBLICATIONS

Mohamed Hefeeda et al., "PROMISE: Peer-to-Peer Media Streaming Using CollectCast"; Proceedings of the 11th ACM International Conference on Multimedia; ACM Multimedia 2003, Berkeley, CA; Nov. 4, 2003.

(Continued)

*Primary Examiner* — Barbara Burgess
(74) *Attorney, Agent, or Firm* — Myers Wolin, LLC

(57) ABSTRACT

A method for increasing bit-rate consumed by a consumer node in a real-time peer-to-peer (P2P) network delivering real-time multimedia content. The method comprises determining desirability to switch to a higher bit-rate consumption respective of a current bit-rate consumption; sending requests to resource nodes of the P2P network for supply of additional bandwidth to support a difference between the higher bit-rate consumption and the current bit-rate consumption; connecting to at least one resource node of the P2P network that can supply the additional bandwidth, thereby increasing bit-rate consumption; determining whether there are connection problems due to the increase in bit-rate consumption; and consuming from the at least one resource node the current bit-rate in addition to the additional bandwidth when no connection problems occur and it is established that the consumer node is capable of handling the higher bit-rate consumption of the real-time multimedia content.

16 Claims, 6 Drawing Sheets

(56) References Cited

U.S. PATENT DOCUMENTS

| | | |
|---|---|---|
| 6,983,326 B1 | 1/2006 | Vigue et al. |
| 7,062,555 B1 | 6/2006 | Kouznetsov et al. |
| 7,075,986 B2 | 7/2006 | Girod et al. |
| 7,096,271 B1 | 8/2006 | Omoigui et al. |
| 7,174,385 B2 | 2/2007 | Li |
| 7,209,973 B2 | 4/2007 | Tormasov et al. |
| 7,408,984 B2 | 8/2008 | Lu et al. |
| 7,577,110 B2 | 8/2009 | Zimmermann et al. |
| 7,813,302 B2 | 10/2010 | Senta et al. |
| 7,818,444 B2 | 10/2010 | Brueck et al. |
| 7,836,184 B2 | 11/2010 | Luzzatti et al. |
| 7,913,293 B2 | 3/2011 | Sun |
| 7,945,694 B2 | 5/2011 | Luzzatti et al. |
| 2002/0144276 A1 | 10/2002 | Radford et al. |
| 2002/0161898 A1 | 10/2002 | Hartop et al. |
| 2003/0005455 A1 | 1/2003 | Bowers |
| 2003/0081582 A1 | 5/2003 | Jain et al. |
| 2003/0151753 A1 | 8/2003 | Li et al. |
| 2003/0152036 A1 | 8/2003 | Quigg Brown et al. |
| 2004/0030797 A1 | 2/2004 | Akinlar et al. |
| 2004/0143672 A1 | 7/2004 | Padmanabham et al. |
| 2004/0236863 A1 | 11/2004 | Shen et al. |
| 2005/0052992 A1* | 3/2005 | Cloonan et al. .............. 370/229 |
| 2005/0108414 A1 | 5/2005 | Taylor et al. |
| 2005/0216559 A1 | 9/2005 | Manion et al. |
| 2006/0007947 A1 | 1/2006 | Li et al. |
| 2006/0224687 A1 | 10/2006 | Popkin et al. |
| 2006/0242315 A1 | 10/2006 | Nichols |
| 2007/0024705 A1 | 2/2007 | Richter et al. |
| 2007/0130361 A1 | 6/2007 | Li |
| 2007/0211677 A1 | 9/2007 | Laroia et al. |
| 2008/0059631 A1* | 3/2008 | Bergstrom et al. .......... 709/224 |
| 2008/0134258 A1 | 6/2008 | Goose et al. |
| 2008/0162713 A1 | 7/2008 | Bowra et al. |
| 2008/0162718 A1* | 7/2008 | Zhang .......................... 709/236 |
| 2008/0195745 A1 | 8/2008 | Bowra et al. |
| 2008/0320087 A1 | 12/2008 | Horvitz et al. |
| 2009/0019113 A1 | 1/2009 | Wu et al. |
| 2009/0037968 A1* | 2/2009 | Liu et al. ..................... 725/114 |
| 2009/0058983 A1 | 3/2009 | Whited et al. |
| 2009/0182815 A1 | 7/2009 | Czechowski et al. |
| 2009/0327395 A1 | 12/2009 | Park et al. |
| 2010/0135155 A1 | 6/2010 | Sankhavaram |

OTHER PUBLICATIONS

Dongyan Xu et al., "On Peer-to-Peer Media Streaming"; Department of Computer Sciences, Purdue University,West Lafayette, IN 47907; 2002.

Xinyan Zhang et al., "CoolStrearning/DONet: A Data-Driven Overlay Network for Efficient Live Media Streaming"; Department of Information Engineering, The Chinese University of Hong Kong, Shatin, N.T., Hong Kong; 2004.

\* cited by examiner

ADAPTIVE DATA RATE STREAMING IN A PEER-TO-PEER NETWORK DELIVERING VIDEO CONTENT

CROSS-REFERENCE TO RELATED APPLICATIONS

This patent is a continuation-in-part (CIP) of U.S. patent application Ser. No. 12/244,756, filed Oct. 2, 2008, now allowed, the content of which is herein incorporated by reference.

TECHNICAL FIELD

The present invention relates generally to content delivery in a peer-to-peer network, and more specifically to a method for adaptive streaming data rates in a peer-to-peer network delivering timing sensitive content.

BACKGROUND OF THE INVENTION

The ubiquity of the Internet enables new techniques adapted to enable direct distribution of multimedia files and real-time media streaming to end-users in an electronic format. The advantages associated with electronic distribution allow media content providers to establish global distribution systems for digital content. Furthermore, new compression algorithms, designed specifically for multimedia data, dramatically reduce the bandwidth and storage space required for the electronic distribution of multimedia data. This, together with the availability of broadband communication, encourages content providers to adopt the Internet as an alternate distribution system complementing the conventional distribution systems (e.g., cable or satellite TV).

Peer-to-peer (P2P) or grid networks enable the distribution of media between users without using server centric solutions. As an example, P2P file sharing systems are well known in the industry and use a very efficient technology to deliver media. Examples for such P2P systems are BitTorrent® and Gnutella. However, these systems do not distribute the content in real-time. Rather, a user can download the content (files) and view it only when the download has completed, i.e., a user cannot view the file while downloading it.

Recently, new systems for real-time streaming of video content over P2P networks have been developed. Examples for such systems may be found in "A Data Driver Overlay Network for Efficient Live Media Streaming" by Zhang et al., and in "P2P Media Streaming", by Hefeeda et al., both of which are incorporated herein by reference merely for the useful understanding of the background of the invention.

Real-time streaming systems fail to fully utilize the network's resources, as they do not consider the asymmetric nature of the nodes (peers) in a typical Internet protocol (IP) network. Generally, such systems consider the upload bandwidth of nodes as equal to the download bandwidth. This is rarely the case in IP networks, such as asymmetric digital subscriber line (ADSL) and cable based networks, as in most cases a node's upload bandwidth is half or less of the download bandwidth. Another type of real-time P2P network for distributing media can be found in PCT application number PCT/IL2007/000392 (now U.S. Pat. No. 7,945,694) entitled "Realtime Media Distribution in a P2P Network", by Omer Luzzatti et al. (hereinafter "Luzzatti") which is assigned to common assignee and incorporated herein by reference merely for the useful understanding of the background of the invention. Luzzatti discloses a real-time P2P network where nodes in the network can act in the role of 'amplifiers' to increase the total available bandwidth made available in the network and thus to improve the quality of the media consumed by the viewers.

When one peer in the peer-to-peer network is designated to provide content to a plurality of other peers that are connected to the delivering peer node, there may be differences in bandwidth requirements for each of the receiving peers due to many reasons. These include bandwidth limitations resulting from the output bandwidth of the delivering node, the bandwidth limitations of each receiving node, as well as limitations of various units that are placed in between the delivering node in the peer-to-peer network and the receiving nodes of the peer-to-peer network.

Techniques for allocating resources in a real-time peer-to-peer network are discussed in a co-pending U.S. patent application Ser. No. 12/120,652, filed on May 15, 2008, entitled "A Method for Managing the Allocation of Resources to Channel Swarms in a Peer-to-Peer network" and in a PCT application PCT/IL2007/001187 entitled "System and Methods for Peer-To-Peer Media Streaming", filed on Sep. 25, 2007, each of which is assigned to common assignee and incorporated herein by reference merely for the useful understanding of the background of the invention.

Prior art solutions typically either arbitrarily allocate a quota for delivery to each of the receiving nodes or divide the available bandwidth between the receiving nodes of the peer-to-peer network. However, this does not necessarily provide a good solution for systems where a receiving node may be joining or disconnecting from the system. It would further be problematic for networks where network conditions change, which is a typical occurrence in today's complex and heavily loaded networks.

Some prior art solutions further attempt to address yet another problem and that is of the need to receive certain multimedia content in different qualities. For example, a video stream may be practical to receive at 300 Kb/Sec for certain viewers, while others can handle double or triple that rate. Therefore, adaptive approaches have been developed to address such bit-rate adaptation. A simple way to handle this is to create a plurality of streams in different bit-rates so that a consumer can automatically adapt to a stream having a desired bit-rate.

A premise to all that is a prior knowledge of the available bandwidth between the transmitter and the receiver. However, this is not feasible in a P2P network where a consumer node may receive the stream in segments from many resource nodes and through different nodes in the path between the content distributor and a consumer node, e.g., a node receiving and displaying multimedia content.

It would be therefore advantageous to provide a solution that allows for supply of multimedia content in P2P networks, and in particular a video stream, and be able to switch between different bit-rates transparently and smoothly.

SUMMARY OF THE INVENTION

Certain embodiments disclosed herein include a method for increasing bit-rate consumed by a consumer node in a real-time peer-to peer (P2P) network delivering real-time multimedia content. The method comprises determining desirability to switch to a higher bit-rate consumption respective of a current bit-rate consumption; sending requests to resource nodes of the P2P network for supply of additional bandwidth to support a difference between the higher bit-rate consumption and the current bit-rate consumption; connecting to at least one resource node of the P2P network that can supply the additional bandwidth, thereby increasing bit-rate consumption; determining whether there are connection problems due to the increase in bit-rate consumption; and consuming from the at least one resource node the current bit-rate in addition to the additional bandwidth when no connection problems occur and it is established that the consumer node is capable of handling the higher bit-rate consumption of the real-time multimedia content.

Certain embodiments disclosed herein further include a real-time peer-to-peer (P2P) network for delivery of real-time multimedia content. The P2P network comprises at least one resource node for delivering real-time multimedia content; and a plurality of consumer nodes for receiving the real-time multimedia content distributed by the at least one resource node over a network, the plurality of consumer nodes grouped in at least a first group consuming the real-time multimedia content at a first bit-rate and a second group consuming the real-time multimedia content at a second bit-rate, the second bit-rate is higher than the first bit-rate; wherein at least one consumer node of the plurality of consumer nodes is adapted to initiate a check and perform a transition from the first group to the second group without being required to handle a bit-rate that is above that of the second bit-rate and while maintaining a stream of the real-time multimedia content at the first bit-rate until it is determined that the at least one consumer node is capable of sustaining the second bit-rate.

Certain embodiments disclosed herein also include a consumer node operable in a real-time peer-to-peer (P2P) network. The consumer node comprises an interface to at least one resource node, the at least one resource node supplies real-time multimedia content in at least a first bit-rate and a second bit-rate, the second bit-rate is higher than the first bit-rate; and a processor initiating a check and performing a transition from the first bit-rate to the second bit-rate without being required to handle a bit-rate that is above that of the second bit-rate and while maintaining a stream of the multimedia content at the first bit-rate until it is determined that the consumer node is capable of sustaining the second bit-rate.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
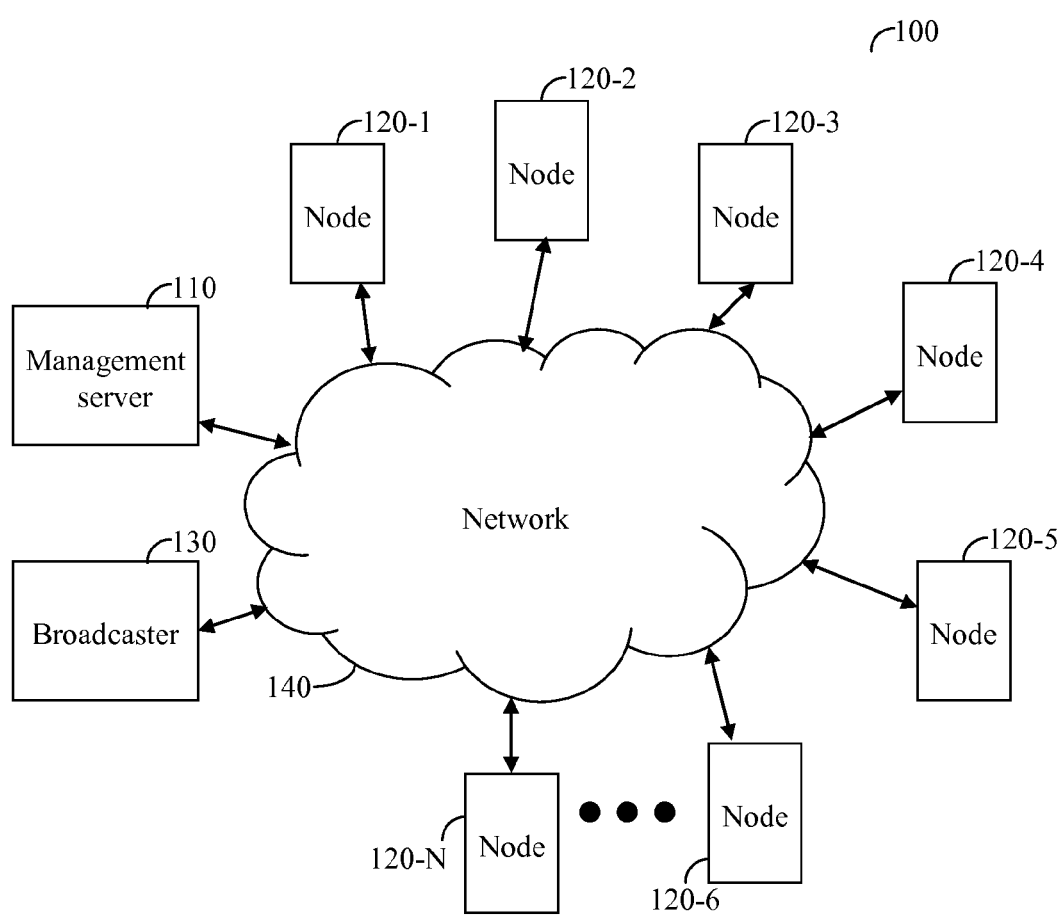
FIG. 1 is a diagram of a P2P network for distributing real-time video content.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 shows a non-limiting and exemplary block diagram of a P2P network 100 for real-time distribution of real-time content used to describe the certain embodiments of the invention. The P2P network 100 includes a plurality of nodes (peers) 120 and a broadcaster 130, all of which communicate with each other over a network 140, that can be a wired network, a wireless network, or any combination thereto, and using a variety of communication protocols. The P2P network 100 may further include a centralized management server 110. The P2P network 100 is utilized to distribute content in several parallel (and alternative) "channels". For example, the P2P network 100 may distribute several unrelated channels (e.g., TV-like channels) of real-time streaming media, with viewers who can choose to view one particular stream at a time.

The nodes 120 distributing the content of a particular channel constitute a "channel swarm." The nodes 120 may be, but are not limited to, personal computers, servers, portable media devices, media control devices, set-up boxes, smart-phones, tablet computers, or any other device capable of exchanging data with other nodes connected to it. A node may also refer to a module of a system, such as a media player. Each node 120 can act as a consumer-node and/or a resource-node.

A consumer-node is a node 120-$c$ (where c is an integer greater than or equal to 1) that belongs to an end-user who wants to watch a channel (i.e., to consume the real-time content). Each consumer-node is constrained to join one or more channel-swarms as determined by the end-user, and must receive a complete, consumable stream of the real-time content. An end-user can view media content broadcasted in a channel on a display connected to the consumer-node. This includes, but is not limited to, a TV screen connected to a set-up box or a monitor connected to a personal computer.

A resource-node is a node 120-$r$ (where r is an integer greater than or equal to 1) with an available upload bandwidth that can be contributed to the one or more channel-swarms. In accordance with one embodiment, a resource-node may be a dedicated network device that shares its bandwidth, but does not consume the media. Such devices are typically installed by service providers. A resource-node may be also an amplifier as described in greater detail in Luzzatti. It should be noted that different resource-nodes may have different capabilities, and in particular may be differently capable of providing resources to different consumer-nodes. The allocation of particular resource-nodes to a channel should be chosen to guarantee a certain quality of service, while minimizing the overhead associated with joining a channel swarm.

In accordance with an embodiment of the invention, a node 120 communicates with each and other nodes 120 and with the management server 110 using, for example, a network interface integrated in the server 110 and a node 120. A node 120 may also include a processor (not shown) to perform various tasks when acting as a resource or consumer node. These tasks are discussed in greater detail herein.

The management server 110 is preferably a distributed, scalable, hardware independent system that performs the tasks related to the management of the real-time distribution of media content over the P2P network 100. The management server 110 typically provides channel and peering information to nodes 120. For example, such information may include a list of channel swarms that a node 120 may join based on information collected from the network 100 or predicated by the behavior of channel swarms.

The broadcaster 130 originates the live stream that, together with a set of resource-nodes 120-r, participate in the transmission of a TV-like channel media or other type of media to create a channel swarm. A channel swarm also includes a set of consumer-nodes which consume the media. It should be noted that a resource node and/or a consumer-node may be parts of other channel swarms.

Figure 2:
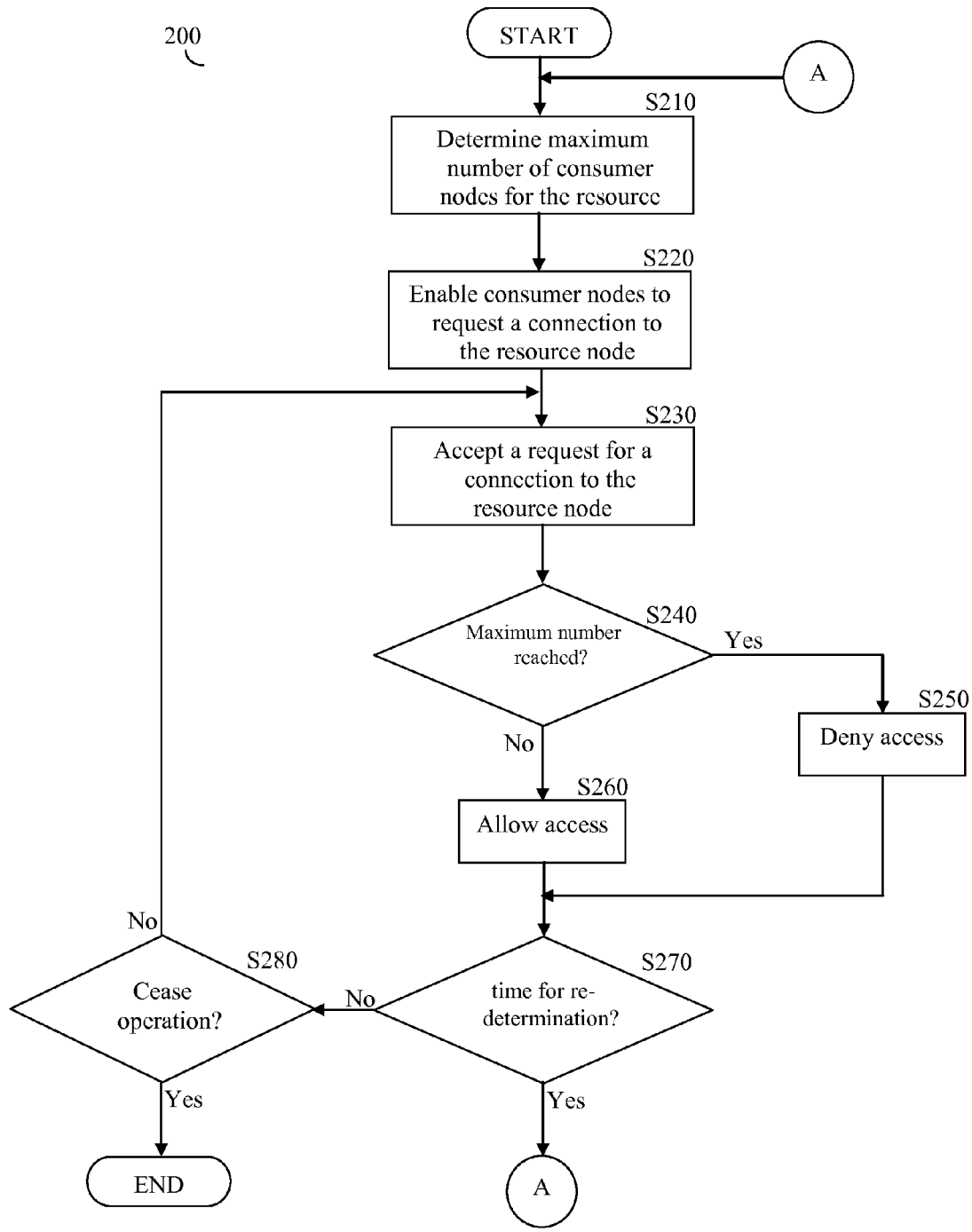
FIG. 2 is a flowchart describing the quota control process performed in accordance with an embodiment of the invention.

FIG. 2 shows an exemplary and non-limiting flowchart 200 describing a quota control process performed in accordance with an embodiment of the invention. In S210, a resource node 120-r determines a maximum number of consumer nodes 120-c that may connect to the resource node 120-r (hereinafter the "maximum allowable connections parameter"). The initial value of the maximum allowable connections parameter may be an arbitrary value. In an embodiment of the invention, a value of the maximum allowable connections parameter may be determined by dividing a bandwidth requirement equally, which in return determines the maximum number of consumer nodes 120 that can be connected to a particular resource node. As noted above, any one of the plurality of consumer nodes 120 may function as a resource node.

In S220, the resource node 120-r is enabled to accept connection requests from consumer nodes 120-c. In S230, the resource node receives a request for a connection from a consumer node 120-c. In S240, it is checked if the maximum number of consumer node 120-c connections has been reached at the resource node 120-r, and if so execution continues with S250; otherwise, execution continues with S260.

In S250, a request to receive content from the resource node 120-r by a requesting consumer node 120-c is denied due to exceeding the maximum number of permitted connections. Then, execution continues with S270. In S260, access by the requesting consumer node 120-c is granted as the quota was not yet reached. In S270, it is checked if the time period has come to re-determine connection parameters for resource node 120-r, and if so execution continues with S210; otherwise, execution continues with S280. In S280, it is checked whether it is necessary to cease operation, and if so execution terminates; otherwise, execution continues with S230. While a certain order or steps has been shown hereinabove, other orders are possible without departing from the spirit of the disclosed invention.

Figure 3:
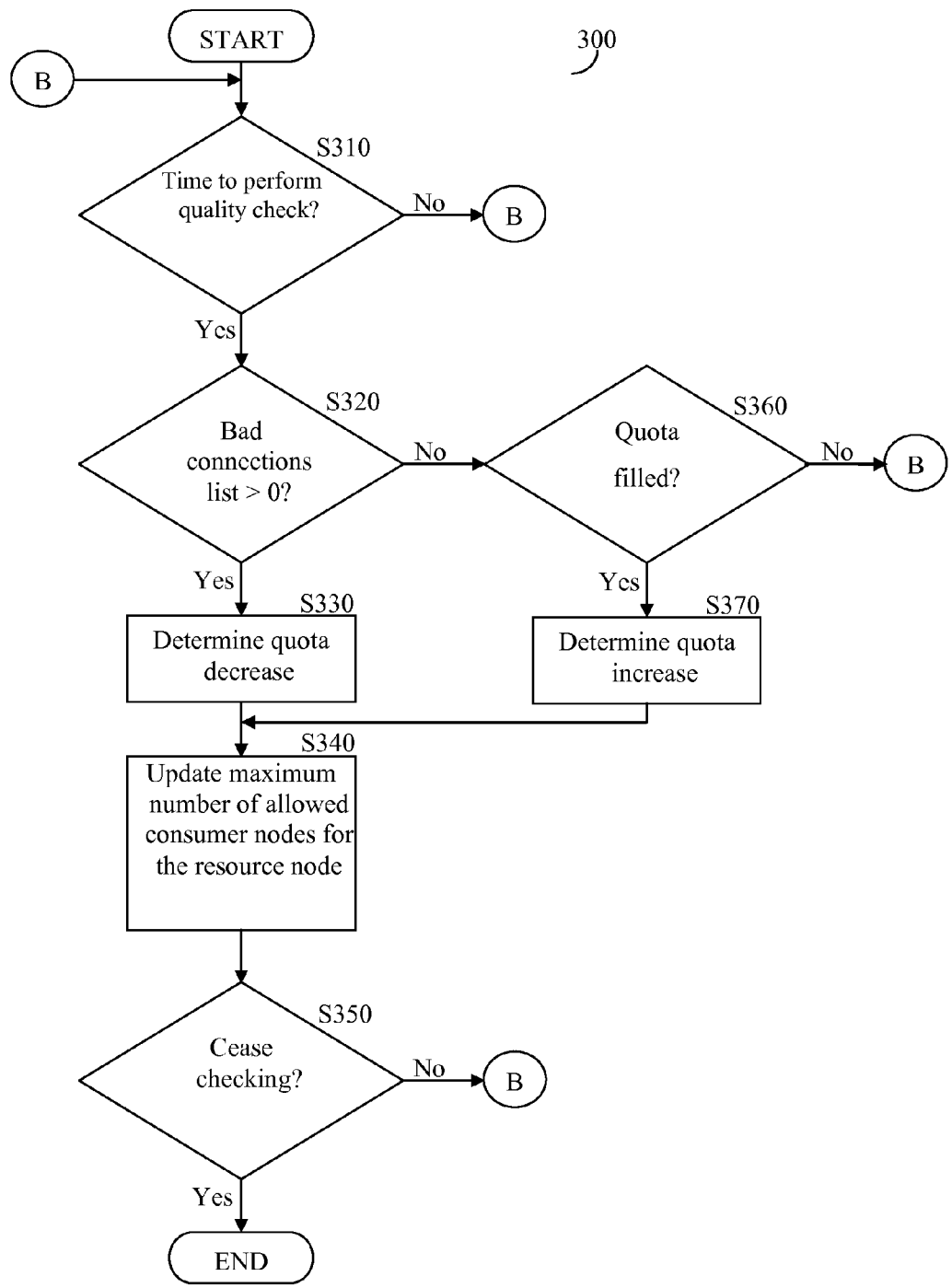
FIG. 3 is a flowchart describing the quota decrease or increase of the quota control process according to an embodiment of the invention.

FIG. 3 shows an exemplary and non-limiting flowchart 300 describing the quota decrease or increase according to an embodiment of the invention. In S310 it is checked whether it is time to perform a quality check, and if so execution continues with S320; otherwise, execution continues with S310. A quality check may be performed, for example, at predefined time-intervals, when connection conditions have been changed, when the changes occur in the channel swarm (e.g., nodes added/removed), upon a request generated by a management server, and so on.

In S320, it is checked whether a bad connections list for the consumer nodes contains one or more consumer nodes, and if so execution continues with S330; otherwise, execution continues with S360.

In S330, a decreased quota value for the resource node 120-r is determined upon detection of at least one bad connection with the consumer node. In an embodiment of the invention, it is possible to cause the resource node 120-r to drop the connection of certain consumer nodes 120, according to the number of the decreased quota value, already connected to the resource node 120-r. In S360, it is checked if the allocated quota was filled, and if not, execution returns to S310; otherwise, execution continues with S370. In S370, the increased quota is determined after which execution continues with S340, where the maximum quota value is updated. The resource node 120-r may use the updated quota value when controlling the quota as performed by a resource node. Both increase of quota and decrease of quota may be done in a plurality of ways and non-limiting examples are provided herein below.

It should be noted that the bad connections list is reset for future determination. The list is updated periodically based on determination of the connection condition between each consumer node 120-c and the resource node 120-r. Each resource node 120-r maintains such a list for its own management purposes, thereby being independent for the determination of the quota from other resource or management nodes of the P2P network. It should be appreciated that various techniques can be utilized for the determination of the quota, one of which is described herein below.

In S350 it is checked if the method should cease checking if the quota value should be updated, and if so execution terminates; otherwise, execution continues with S310.

Following is an exemplary and non-limiting description of an embodiment of the methods of the invention. The method has the following variables: "quota" is the current maximum limit of number of acceptors; "num_acc" is current number of acceptors, typically maintained by an outside process (PC); "wait_cycles" is the number of quality check cycles to ignore; "last drop" is time of last drop; "filled_quota" holds the current quota been filled ever; and, "quota_full" is time of filling of quota.

To allow consumer nodes 120 to connect to a resource node 120-r, then, upon a request from a consumer node 120-c, if quota is larger than num_acc plus one then, the variable quota_full is loaded with the current time and the variable filled_quota is changed to true. Thereupon the connection of the consumer node 120-c to the resource node 120-r is allowed. Otherwise, if quota is not larger than num_acc plus one, then the connection between the requesting consumer node 120-c and the resource node 120-r is not allowed.

A quota that is the number of consumer nodes 120 that can connect to a given resource node 120-R has to be determined, as noted above. The following parameter values are set, however, these values should be understood to be exemplary and non-limiting values and they may be changed without departing from the scope of the disclosed invention. The initial value for the quota INIT_QUOTA is set to '2'; for the minimum quota MIN_QUOTA is set to '1'; the maximum quota value MAX_QUOTA is set to '10,000'; the period of time between checks to check on the quality of service QUALITY_CHECK_TIME is set to '500 milliseconds'; the drop ratio of a consumer node 120-r ACCEPTOR_DROP_RATIO is set to '0.5'; the number of wait cycles for quality determination QUALITY_WAIT_CYCLES is set to '3'; the increase check time INCREASE_CHECK_TIME is set to '500 milliseconds'; the increase delay INCREASE_DELAY is set to '30,000 milliseconds'; and, the increase ratio INCREASE_RATIO is set to '0.25'. Then, during every QUALITY_CHECK_TIME period if wait_cycles is greater than zero then wait_cycles is decreased by one; otherwise, a list is created to contain a reference to those consumer nodes considered to be in bad standing. Such a bad standing can be a result of monitoring the connection conditions requiring the use of lower transmission speed, and others as may be applicable.

If the list contains at least one entry then several actions take place: the last_drop variable receives the current time value; the num_drop value receives the ceiling value of the multiplication of the number of bad consumer nodes 120-*c* found in bad_acceptors_list and the ACCEPTOR_DROP_RATIO; from the consumer nodes 120 in the list bad_acceptors_list a number equal to the value of num_drop are dropped from being in communication with the resource node 120-*r*; the quota value is reduced by the value of num_drop; if the value of quota is less than the value of MIN_QUOTA then quota receives the value of MIN_QUOTA, therefore, in this case, as MIN_QUOTA has a value set to '1' it prevents the resource node 120-*r* from not servicing any consumer node 120-*c*; and, the value of the wait_cycles returns back to the initialization value QUALITY_WAIT_CYCLES.

From time-to-time, in accordance with the principles of the invention it may be possible to increase the number of consumer nodes 120 connected to a resource node 120-*r*. This may be done periodically, for example, every INCREASE_CHECK_TIME period of time. At such time, if the value of filled_quota is true; the current time minus the value of quota_full is greater than the value of INCREASE_DELAY; and, the current time minus the value of last_drop is greater than the value of INCREASE_DELAY, then it is possible to increase the quota. This is done by setting the value of filled_quota to 'false'; adding to the current value of quota the ceiling value of the value of quota multiplied by the value of INCREASE_RATIO; and, if the value of quota is greater than the value of MAX_QUOTA then forcing the value of quota to MAX_QUOTA, thereby ensuring that the maximum quota for a specific resource node 120-*r* will not be above a certain number, which is in the instant example the value of '10,000'.

Returning to FIG. 1, in accordance with one embodiment of the invention, nodes (peers) of the P2P network comprise a group that is capable of providing and/or receiving multimedia content, such as video and/or audio content. A node in the P2P network may act as a resource node 120-*r* or a consumer node 120-*c* or be both at the same time, all depending on its capabilities. However, there is a need in the art to be able to provide the same content in different bit-rates to nodes (e.g., consumer nodes) of the P2P network. This is typically a result of the bandwidth available at relative proximity to the node.

For example, but not by way of limitation, one may consider the case of three viewers A, B and C, of a video stream that is transferred over a total bandwidth of 900 Kb/Sec, where the three viewers are wirelessly connected to a transmission tower with their mobile device, for example, smartphones. They get equal share of the bandwidth, and therefore each receives 300 Kb/Sec. If viewer C drops from the system, it would be desirable, and in fact possible, for viewers A and B to increase their bit-rate up to 450 Kb/Sec each in a fair share system. However, as they are receiving video segments from a plurality of nodes in the P2P network, it is in fact impossible to determine how to make use of this additional bandwidth available.

Therefore, according to an embodiment of the invention, the P2P network can provide the same content in different bit-rates. A node in the P2P network may opt to join to a group within the P2P network that provides a bit-rate suitable to the viewer, as explained in more detail herein below.

Figure 4:
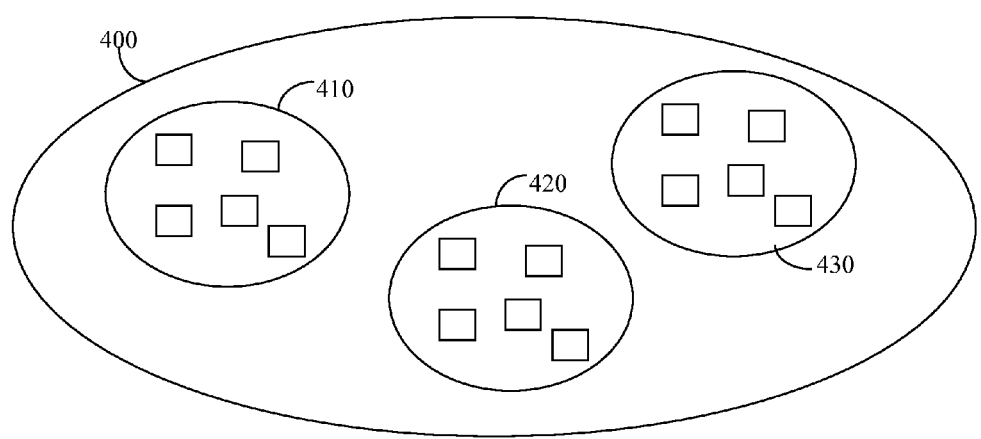
FIG. 4 is a diagram describing a plurality of groups within the P2P network, each group provided with content at a different bit-rate.

Referring to FIG. 4, there is shown an exemplary and non-limiting diagram describing a plurality of groups of nodes within the P2P network 400, each group provided with content at a different bit-rate. Nodes in the group may include a consumer node 120-*c* only or both consumer nodes 120-*c* and resource nodes 120-*r*. In some cases, a resource node 120-*r* may be capable of supporting more than a single bit-rate and hence be part of more than one group. Group A 410 receives a low bit-rate, for example 300 Kb/Sec, group B 420 receives a medium bit-rate, for example 500 Kb/Sec, and group C 430 receives a high bit-rate, for example 800 Kb/Sec. All the nodes of the P2P network 400 which may be part of a channel swarm, regardless of their group affiliation, receive the same content, at a different bit-rate, which also has timing cues to allow for correct switching from one group to another. In the case where a node in group B 420 experiences communication problems, such a node may opt to reduce the bit-rate and switch from group B 420 to group A 410. Then, instead of requiring a bandwidth of 500 Kb/Sec the node will be able to use only 300 Kb/Sec and experience an overall better quality of service (QoS). Similarly, in the case where a node in group B 420 wishes to increase the bit-rate as there are no communication problems, then such a node may opt to increase the bit-rate and switch from group B 420 to group C 430. Then, instead of requiring a bandwidth of 500 Kb/Sec the node will need 800 Kb/Sec and experience, for example, a higher frame rate or resolution, and so on. It should be noted that the group granularity shown is merely exemplary and finer or coarser granularities may exist without departing from the scope of the invention.

Figure 5:
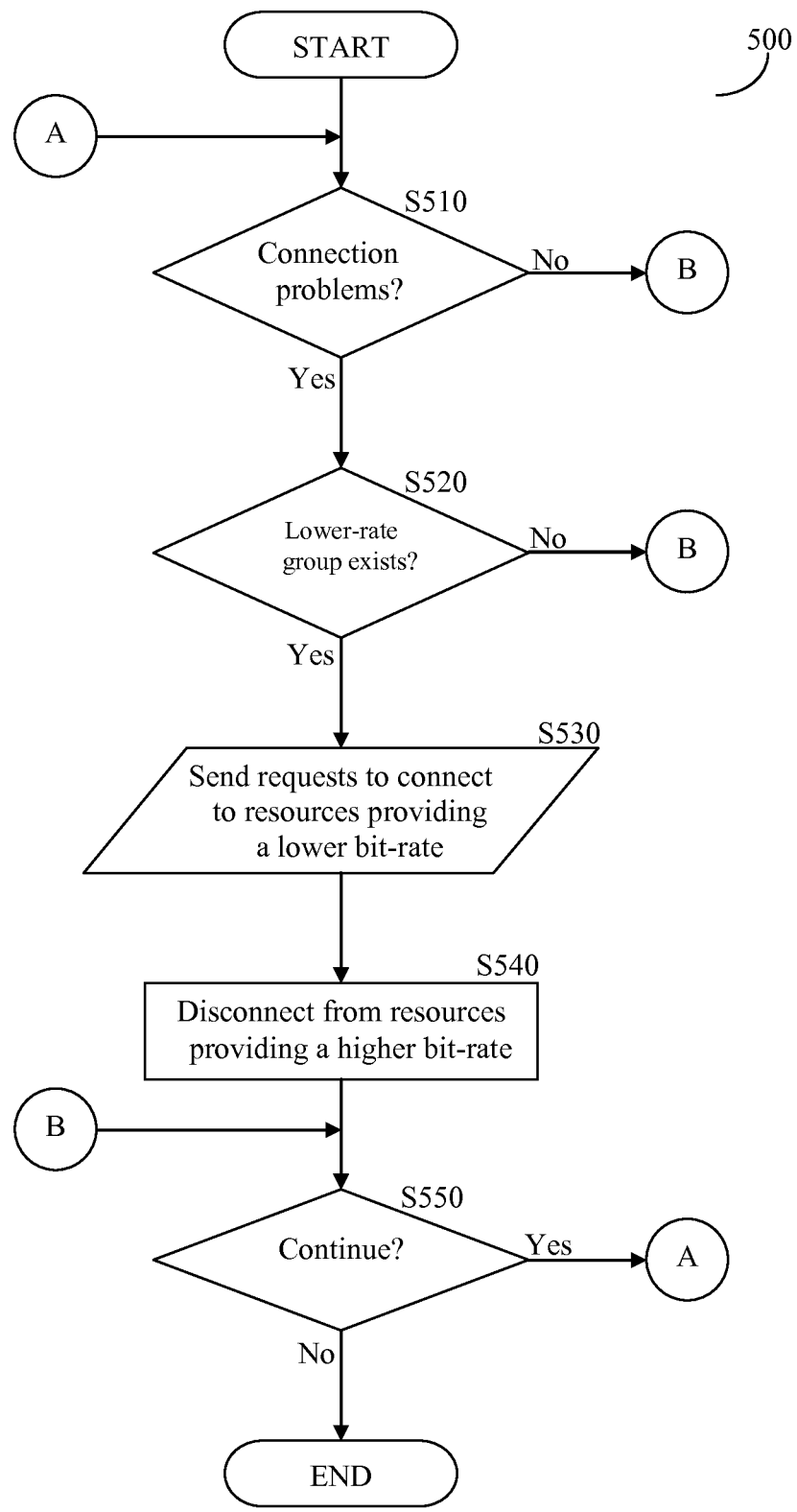
FIG. 5 is a flowchart describing the move of a peer within a P2P network from a higher bit-rate group to a lower bit-rate group in accordance with an embodiment of the invention.

FIG. 5 depicts an exemplary and non-limiting flowchart 500 describing the move of a peer within a P2P network from a higher bit-rate group to a lower bit-rate group. In S510, a consumer node 120-*c* belonging to a group within a P2P network, for example group B 420, checks if there are connection problems relative to the bandwidth it has available for the P2P communication. If it is determined that such problems exist, execution continues with S520; otherwise, execution continues with S550.

In S520 it is checked whether a group exists having a lower bit-rate, for example group A 410, to which the consumer node 120-*c* can downgrade to, and if so execution continues with S530; otherwise, execution continues with S550. As mentioned above, a plurality of bit-rate groups may exist in the P2P network and/or a channel swarms operable in the P2P network. Some groups are with higher bit-rate and others with lower bit-rate than the group the consumer node 120-*c* is currently connected to. Thus, if it is determined that the consumer node 120-*c* must downgrade, the consumer node 120-*c* selects one of the lower bit-rate groups to join to. In an embodiment of the invention, the consumer node 120-*c* joins a group with a bit-rate level that is one below the current group that the consumer node 120-*c* belongs to. In another embodiment the consumer node 120-*c* attempts to determine the maximum bit-rate it can receive and join a group providing the lower bit-rate that can support the maximum determined bit-rate for the consumer node 120-*c*.

In S530 requests to connect to resource nodes 120-*r* are sent by the consumer node 120-*c* that support the lower bit-rate, for example of group A 410. According to an embodiment of the invention, resource nodes 120-*r* of the P2P network may be tagged according to the bit-rate(s) they can support. Thus, the requests from the consumer node 120-*c* can be addressed only to resource nodes capable of providing the desired transmission bit-rate.

According to certain embodiments of the invention, each resource node 120-*r* that receives a request from the consumer node 120-*c*, checks if it has enough band-width quota to allow connection with the consumer node 120-*c*. The quota check may be performed as described in detail above.

In S540, upon receiving connections acknowledgment from one or more resource nodes, the consumer node 120-*c* disconnects from the resource node(s) 120-*r* that supplies the higher bit-rate. Immediately after, the consumer node 120-*c* connects to the one of more resource nodes 120-*r* that supply a lower bit-rate and acknowledge the connection requests. Therefore, the consumer node 120-*c* can hop from a higher bit-rate group to a lower bit-rate group without losing synchronization to the content being streamed. This is enabled due to the fact that the consumer and resource nodes are part of a channel swarm and, regardless of their group affiliation, receive the same content, at a different bit-rate, which has also timing cues to allow for correct switching from one group to another. The switching takes place, content wise, once the content already at the node 120-*c* is consumed all the way to the cue point.

In S550, it is checked whether the process should continue, and if so execution continues with S510; otherwise, execution terminates.

Figure 6:
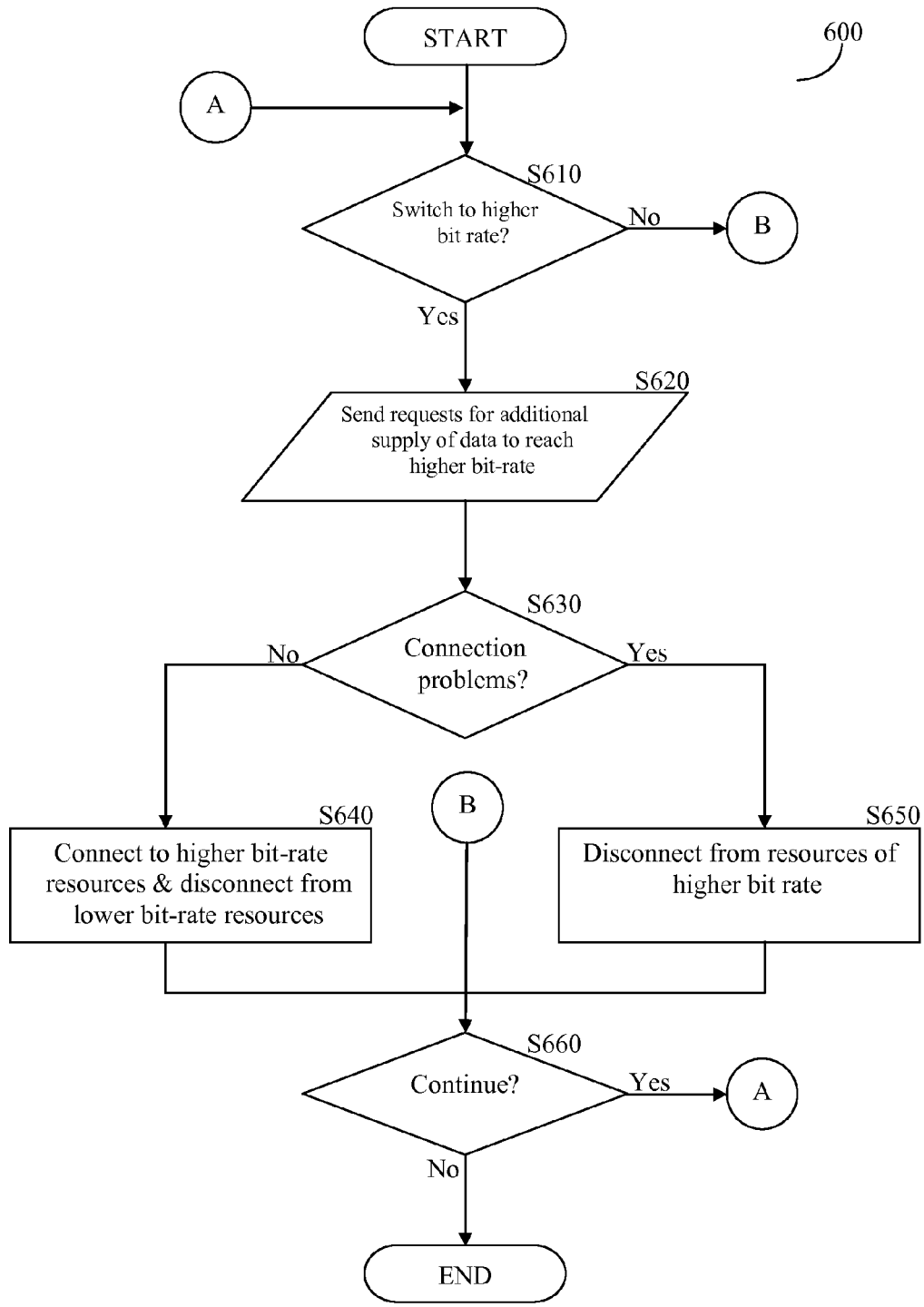
FIG. 6 is a flowchart describing the move of a peer within a P2P network from a lower bit-rate group to a higher bit-rate group in accordance with an embodiment of the invention.

FIG. 6 shows an exemplary and non-limiting flowchart 600 describing the move of a peer within a P2P network from a lower bit-rate group to a higher bit-rate group. In S610, the consumer node 120-*c*, for example belonging to group B 420 in the P2P network 400, determines that it is desirable to attempt to connect at a higher bit-rate. Such attempt may be performed, for example, when there are no quality problems in the reception and there is a group that allows a higher bit-rate (i.e., quality) than the current group that the consumer node 120-*c* is connected to. In addition, an attempt to move to a higher bit-rate group may initiated indirectly by a viewer. For example, when the viewer wishes to watch high-definition video rather than currently streamed low-definition video (e.g., by changing setting of the video player), an attempt to move to a higher bit-rate group may be performed.

Transition from a low bit-rate to high bit-rate group, is not a simple task when no knowledge is available regarding the bandwidth requirements and how they are going to be provided when there are multiple resource nodes 120-*r* that participate in the providing of the necessary content. If it was established that switching to a higher bit-rate is desirable then execution continues with S620; otherwise execution continues with S660.

In S620, requests for additional data from resource nodes 120-*r* that support the higher bit-rate are sent. It should be noted that the requests are sent only for the purpose of fulfilling the delta in bandwidth and connecting to such resource nodes 120-*r* to account of the difference in bit-rate consumption. For example, if the consumer node 120-*c* was in group B 420, and consuming at a bandwidth of 500 Kb/Sec and now is attempting to move to group C 430, then only 300 Kb/Sec (800 Kb/sec minus 500 Kb/Sec) are requested. This allows the consumer node 120-*c* to determine if it can successfully sustain the higher bit-rate.

Each resource node 120-*r* receiving the request, determines if it has sufficient bandwidth quota to accept a connection from the consumer node 120-*c*. The bandwidth quota check is performed as described in detail above.

The consumer node 120-*c* is connected to one or more resource nodes 120-*r* that can supply the delta in bandwidth. For example, if two resource nodes 120-*r* can support the additional bandwidth, then the consumer node 120-*c* consumes content only from these two resource nodes 120. In S630, it is checked whether connection problems are present when consuming higher bit-rate, and if not then execution continues with S640; otherwise, execution continues with S650. Connection problems are cases where there is insufficient data in a given bit-rate to sustain continuous video display. As a result, display will be sketchy, suffer from blockiness, and other quality related deficiencies in video and audio reception. These can include cases where data is expected and not timely arrived at the node, only part of the data arrives, or there is a frequent need for retransmission of data, to name a few connection problems.

In S640 the consumer node 120-*c* connects with resource nodes 120-*r* that are capable of providing the higher bit-rate while disconnecting from resource nodes 120-*r* that provide content at the lower bit-rate. At this point, it is known that the consumer node 120-*c* can handle this higher bit-rate. In an embodiment of the invention, the consumer node 120-*c* sends the requests for the additional bandwidth to resource nodes 120-*r* that already provide the delta bandwidth, as the switching from the lower bit-rate to the higher bit-rate can occur when already some of the resource nodes 120-*r* for the higher bit-rate are connected. In another embodiment of the invention, a demi-resource node(s) is available to simulate such a load, which is not later used for providing the actual data. A demi-resource node is a node connected to the network that can simulate to another node a higher bit-rate that comprises load data that is not useable as video data. Thus, according to this embodiment, the consumer node 120-*c* disconnects from the demi-resource and connects to one or more resource nodes in a group providing higher bit-rate, then is currently consumed.

In S650, once it is determined that there are connection problems, the consumer node 120-*c* releases connections to resource nodes 120-*c* providing higher bit-rates and maintains the original bit-rate it started with. In S660, it is checked whether the process should continue and if so execution continues with S610; otherwise, execution terminates.

It should be noted that the methods described herein can be further utilized by a consumer node 120-*c* that joins a channel swarm to adaptively change the bit-rate of the consumed content. For example, in one embodiment, the consumer node may join a channel swarm supported by a best available group and downgrade to a lower bit-rate group when conditions worsen. Thus, the consumer node 120-*c* can join a video swarm and move from a group at one bit-rate to another bit-rate group within the channel swarm without losing synchronization to the content being displayed.

Certain embodiments of the invention may be implemented in hardware, software, firmware, or any combinations thereof. The software may be implemented as an application program tangibly embodied on a program storage unit or computer readable medium. The application program may be uploaded to, and executed by, a machine comprising any suitable architecture, for example, a computer platform having hardware such as one or more central processing units ("CPUs"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings are preferably implemented in software, the actual connections between the system components or the process function blocks may differ depending upon the manner in which the present invention is programmed. Given the teachings herein, one of ordinary skill in the pertinent art will be able to contemplate these and similar implementations or configurations of the present invention. All examples and conditional language recited herein are intended for pedagogical purposes to aid the reader in understanding the principles of the invention and the concepts contributed by the inventors to furthering the art, and are to be construed as being without limitation to such specifically recited examples and conditions.

What is claimed is:

1. A method for adaptively increasing bit-rate consumed by a consumer node in a real-time peer-to-peer (P2P) network delivering real-time multimedia content, comprising:
   determining desirability to switch to a higher bit-rate consumption respective of a current bit-rate consumption provided by a first resource node;
   sending requests to resource nodes of the P2P network for supply of additional bandwidth to support only a difference in bandwidth between the higher bit-rate consumption and a current bit-rate consumption;
   connecting to at least one resource node of the P2P network that can supply the requested additional bandwidth, thereby increasing bit-rate consumption through connections to the at least one resource node providing the requested additional bandwidth and the first resource node, wherein the at least one resource node and the first resource node deliver a same content of the real-time multimedia at different bit rates;
   determining whether there are connection problems due to the increase in bit-rate consumption; and
   consuming, by the consumer node, from the at least one resource node the current bit-rate in addition to the requested additional bandwidth when no connection problems occur and it is established that the consumer node is capable of handling the higher bit-rate consumption of the real-time multimedia content.

2. The method of claim 1, further comprising:
   disconnecting from the first resource node providing the current bit-rate consumption when no connection problems occur and it is established that the consumer node is capable of handling the higher bit-rate consumption; and
   synchronizing to the higher bit-rate consumption based on at least a timing cue in the real-time multimedia content.

3. The method of claim 2, further comprising:
   disconnecting from the at least one resource node when connection problems occur and it is established that the consumer node is incapable of sustaining the higher bit-rate consumption.

4. The method of claim 2, wherein the at least one resource node is configured to provide the higher bit-rate consumption.

5. The method of claim 4, wherein the requests are sent to the at least one resource node that supports the higher bit-rate consumption.

6. The method of claim 2, wherein the at least one resource node is a demi-resource node.

7. The method of claim 6, wherein the demi-resource node is a node connected to the P2P network that simulates to the consumer node the higher bit-rate consumption.

8. The method of claim 6, wherein consumption from the at least one resource node is at the higher bit-rate, further comprising:
   connecting to the at least one resource node that supports the higher bit-rate consumption; and
   disconnecting from the demi-resource and the first resource node providing the current bit-rate consumption.

9. The method of claim 8, wherein switching to the higher bit-rate consumption is initiated upon at least one of: determination that no quality problems occur during the consumption of lower bit-rate multimedia content and the at least one resource node supports the higher bit-rate consumption, and a user request to view the multimedia content at higher quality and the at least one resource node supports the higher bit-rate consumption.

10. A non-transitory computer readable medium having stored thereon instructions for causing one or more processing units to execute the method according to claim 1.

11. A real-time peer-to-peer (P2P) network for delivery of real-time multimedia content, comprising:
   a plurality of resource nodes for delivering real-time multimedia content; and
   a plurality of consumer nodes for receiving the real-time multimedia content distributed by the plurality of resource nodes over a network, the plurality of consumer nodes are grouped in at least a first group consuming the real-time multimedia content at a first bit-rate and a second group consuming the real-time multimedia content at a second bit-rate, the second bit-rate is higher than the first bit-rate;
   wherein each consumer node of the plurality of consumer nodes is configured to initiate a check and perform a transition from the first group to the second group without being required to handle a bit-rate that is above that of the second bit-rate while maintaining a stream of the real-time multimedia content at the first bit-rate until it is determined that the at least one consumer node can sustain the second bit-rate, wherein the initiated check includes sending requests to the plurality of resource nodes of the P2P network for supply of additional bandwidth to support only a difference in bandwidth between the higher bit-rate consumption and a current bit-rate consumption and connecting to at least one resource node of the P2P network that can supply the requested additional bandwidth to determine whether there are connection problems due to the increase in bit-rate consumption, wherein the at least one resource node providing the requested additional bandwidth and a at least one resource node providing the current bit-rate consumption deliver the same content of the real-time multimedia at different bit rates.

12. The P2P network of claim 11, wherein the at least one consumer node is configured to initiate the transition from the first group to the second group upon at least one of: determination that no quality problems occur during the consumption of the real-time multimedia content at the first bit-rate and the at least one resource node supports the second bit-rate, and a user request to view the multimedia content at a higher quality and the at least one resource node supports the second bit-rate.

13. The P2P network of claim 11, wherein the real-time multimedia content further comprises timing cues to allow for synchronized transition from the first group to the second group.

14. A consumer node operable in a real-time peer-to-peer (P2P) network, comprising:
   an interface to at least one resource node, the at least one resource node supplies real-time multimedia content in at least a first bit-rate and a second bit-rate, the second bit-rate is higher than the first bit-rate; and
   a processor configured to initiate a check to perform a transition from the first bit-rate to the second bit-rate without being required to handle a bit-rate that is above that of the second bit-rate while maintaining a stream of the multimedia content at the first bit-rate until it is determined that the consumer node can sustain the second bit-rate, wherein the initiated check includes sending requests to the plurality of resource nodes of the P2P network for supply of additional bandwidth to support only a difference in bandwidth between the higher bit-rate consumption and a current bit-rate consumption and connecting to at least one resource node of the P2P network that can supply the requested additional bandwidth to determine whether there are connection problems due to the increase in bit-rate consumption, wherein the at least one resource node providing the requested additional bandwidth and a at least one resource node providing the current bit-rate consumption deliver the same content of the real-time multimedia at different bit rates.

15. The consumer node of claim 14, wherein the processor is further configured to initiate the transition from the first group to the second group upon at least one of: determination that no quality problems occur during consumption of the real-time multimedia content at a first bit-rate and the at least one resource node supports the second bit-rate, and a user request to view the multimedia content at a higher quality and the at least one resource node supports the second bit-rate.

16. The consumer node of claim 14, wherein the processor is configured to synchronize to the higher bit-rate consumption based on at least a timing cue in the real-time multimedia content.

* * * * *